United States Patent [19]

Zimmermann

[11] Patent Number: 5,293,949

[45] Date of Patent: Mar. 15, 1994

[54] CHASSIS FOR ENDLESS TRACK TYPE VEHICLES

[75] Inventor: Horst Zimmermann, Bludenz, Austria

[73] Assignee: ECCON, Engineering, Computer, Consulting Gesellschaft m.b.H., Nonzing, Austria

[21] Appl. No.: 966,739

[22] Filed: Oct. 26, 1992

[30] Foreign Application Priority Data

Oct. 24, 1991 [AT] Austria ............... 2120/91

[51] Int. Cl.$^5$ ............................. B62D 55/08
[52] U.S. Cl. ............................. 180/9.48; 280/781; 280/144
[58] Field of Search ........... 280/763.1, 638, 80.1, 280/639, 762, 38, 28.5, 42, 781, 144; 180/9.1, 9.48; 305/31, 32

[56] References Cited

U.S. PATENT DOCUMENTS

| | | | |
|---|---|---|---|
| 2,634,663 | 4/1953 | Curtis | 180/9.48 |
| 3,312,291 | 4/1967 | Haug | 180/9.48 |
| 3,700,115 | 10/1972 | Johnson et al. | 180/9.48 |
| 4,519,465 | 5/1985 | Triplett | 180/9.48 |
| 5,072,800 | 12/1991 | Price | 180/9.48 |

*Primary Examiner*—Richard M. Camby
*Attorney, Agent, or Firm*—Feiereisen & Kueffner

[57] ABSTRACT

A chassis for endless track-type vehicles has on both sides thereof pairs of support beams which extend parallel to each other and project horizontally from the chassis. Crawler track supports are mounted on the support beams. The crawler track supports are slidably mounted relative to the support beams in order to change the width of the vehicle. At the free outer end of each support beam are provided arms which are swingable about vertical axes. The circumferential contour or width of the arms corresponds in an upper and/or lower portion thereof to that of the support beam. The arms can be swung into a position in which they extend in the same direction as the support beams. In this position, the arms can be locked relative to the support beam. The swinging angle of the arms is approximately 90°.

8 Claims, 2 Drawing Sheets

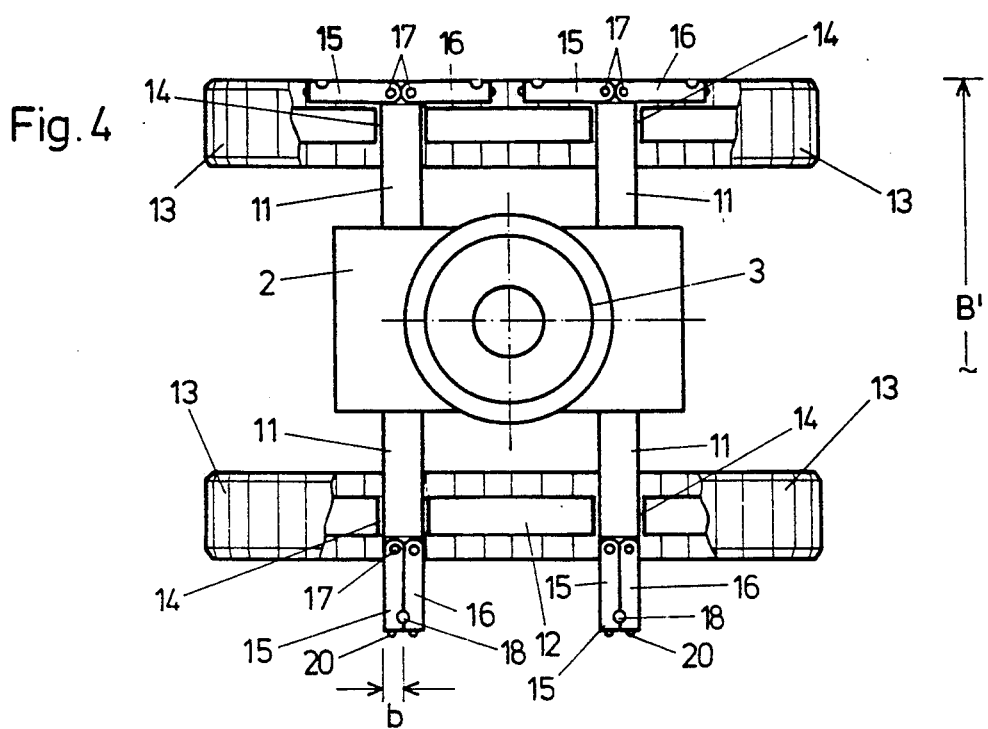
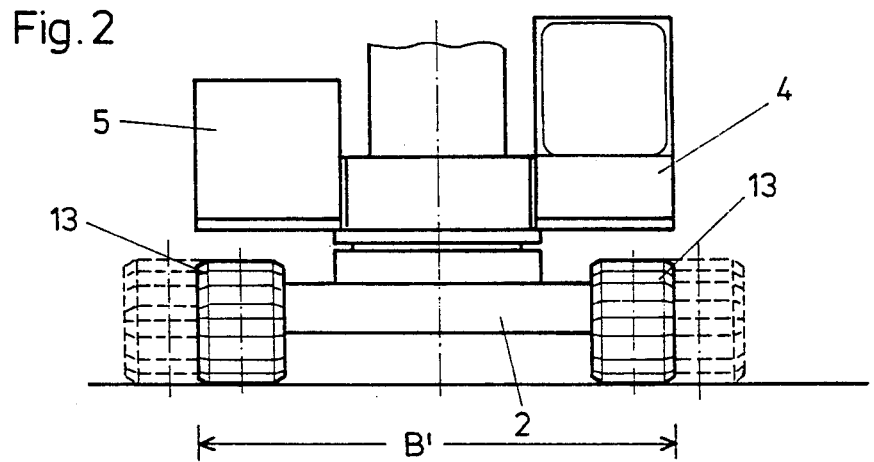
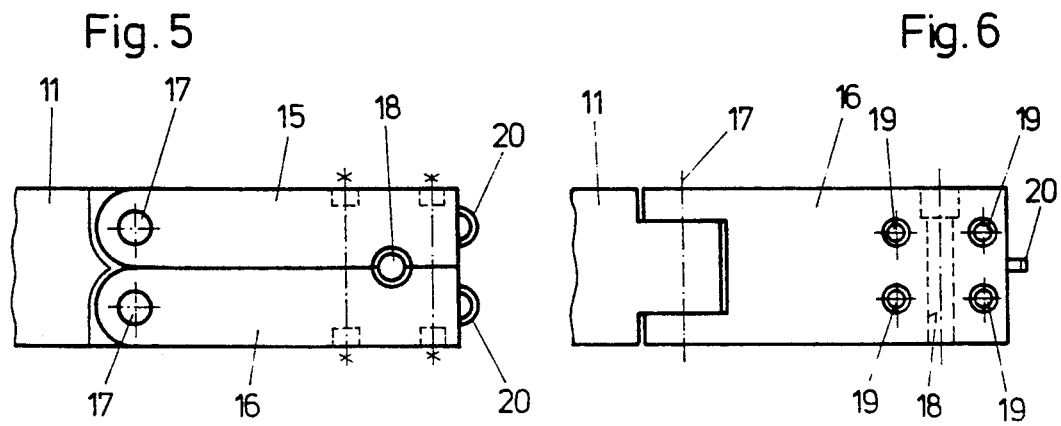

CHASSIS FOR ENDLESS TRACK TYPE VEHICLES

BACKGROUND OF THE INVENTION

1. Field of the Invention

The present invention relates to a chassis for endless track-type vehicles with superstructures for implements and/or tools. At least a pair of essentially horizontally cantilevering support beams are provided on both sides of the chassis. The support beams extend parallel to each other and crawler track supports are slid onto the support beams. The crawler track supports are mounted so as to be slidable relative to the support beams in order to change the width of the endless track-type vehicle.

2. Description of the Related Art

Chassis for endless track-type vehicles are known in various shapes and configurations. The superstructures are single-piece or multiple-piece jibs on which may be arranged excavating tools or the jibs are used together with lifting tools or the like. However, the type of superstructure for the vehicle is not significant in connection with the present invention and, therefore, will not be discussed in detail hereinbelow.

The chassis for endless track-type vehicles have substantial widths which depend on the load-bearing capability of the superstructure. Traffic regulations concerning these types of vehicles usually provide that certain widths may not be exceeded when the chassis of the endless track-type vehicle is to be transported on a flat-bed truck or trailer from one location to another on public roadways. Otherwise, it would become necessary to carry out special transports with escort vehicles which are complicated and expensive and require permits. On the other hand, during operation of such endless track-type vehicles which requires substantial operating forces by the implements mounted on the vehicle, it is desirable that the base area of the vehicle is as large as possible, so that a high tilting moment of the entire arrangement can be achieved.

In order to take into account the contradictory requirements described above, chassis of the above-described type were designed and manufactured in such a way that the chassis could be adjusted to change the width of the caterpillar-type vehicle. For this purpose, the support beams which support the crawler track supports are constructed as longitudinally adjustable telescopic members. However, the telescopic members are of complicated construction, while still only permitting an extension of the crawler track support to a limited extent.

SUMMARY OF THE INVENTION

Therefore, it is the primary object of the present invention to provide a chassis of the above-described type which is of simple construction and in which the adjustment width is increased.

In accordance with the present invention, at least one arm which can be swung about a vertical axis is provided at the free outer end of each support beam. The circumferential of the support beam. When the arm is swung out so that its axis coincides with the axis of the support beam, the arm can be locked relative to the support beam.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the drawing:

FIG. 2 is another partial side view of the vehicle of FIG. 1;

FIG. 4 is a top view, similar to FIG. 3, but showing in detail the components essential for the present invention and showing the crawler tracks partially broken away;

FIG. 5 is a top view, on a larger scale, of the swingable arms; and

FIG. 6 is a side view of the swingable arms of FIG. 5.

DESCRIPTION OF THE PREFERRED EMBODIMENT

Figure 1:
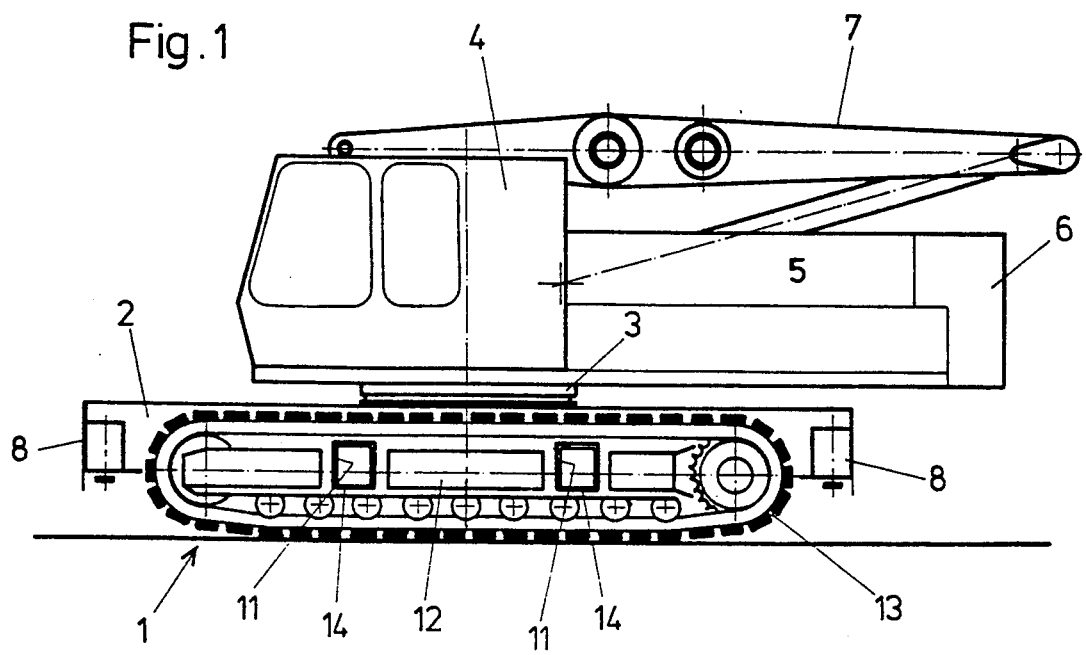
FIG. 1 is a side elevational view of a endless track-type vehicle of conventional

FIG. 1 of the drawing shows a crane with an undercarriage I including a chassis 2. Arranged above the chassis 2 are on a horizontal slewing track ring 3 a driver's cab 4, a housing 5 for the drive units, a counterweight 6 and a cantilever or jib 7. These components are merely mentioned and illustrated as general examples. They can be replaced by other components without leaving the scope of the invention.

Figure 3:
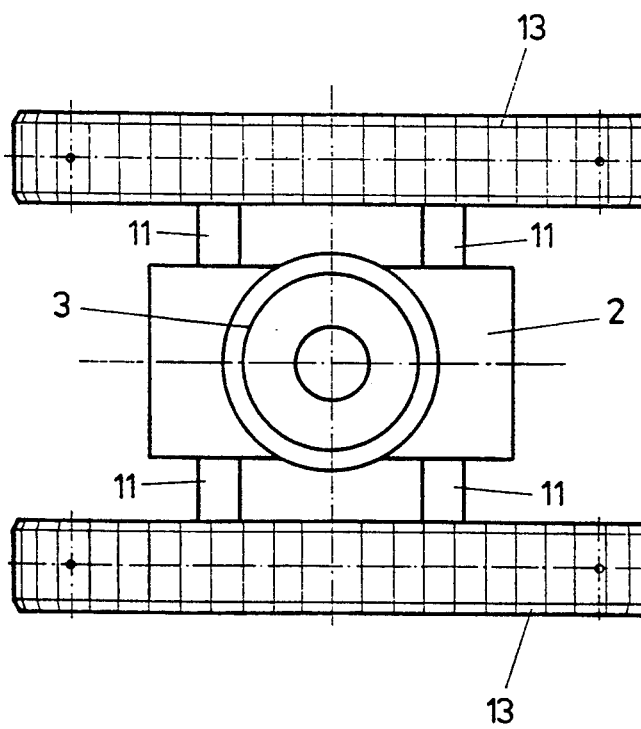
FIG. 3 is a top view of the chassis of the vehicle of FIG. 1.

As can be seen in FIG. 3, the chassis 2 is H-shaped in horizontal direction. The above-described slewing track ring 3 is provided in the central portion of the chassis 2.

Pairs of laterally projecting support beams 11 of predetermined length are arranged in the middle portion of the chassis 2 and advantageously on both sides of the slewing track ring 3. In the illustrated embodiment, the support beams 11 are constructed as box sections. The crawler track supports 12 are slid onto the support beams 11 and are anchored by beams of conventional and known means, not shown. As a rule, track rods hinged to the chassis 2, on the one hand, and to the crawler track support 12, on the other hand, are used for securing the crawler track supports 12. Several hinge points arranged one behind the other in transverse direction of the chassis 2 are provided on the chassis 2 for the track rods. Hydraulic piston-cylinder units are additionally hinged to the chassis 2, wherein the other ends of the piston-cylinder units can be connected alternatingly to the right or left crawler track support. When the crawler track support 12 is to be displaced on the support beam of predetermined length, the track rod is disconnected and the above-mentioned hydraulic piston-cylinder unit is placed in operating position. By an appropriate slewing of the superstructure of the vehicle about the vertical axis of rotation, the load on the crawler track support to be adjusted can be removed, so that this crawler track support can be displaced on the support beam by the hydraulic piston-cylinder unit.

The crawler track support 12 is a welded steel box and supports the crawler track 13 as well as the structural components provided for driving, deflecting and guiding the crawler track 13. Cut-outs 14 are provided in the box-shaped component, as shown in FIG. 1 of the drawing. The cut-outs 14 have a cross-sectional contour which corresponds with respect to shape and size to the support beam 11, so that the crawler track support 12 can be slid onto the support beam 11 and can be displaced relative to the support beam I 1. The axial length of the support beam 11 determines the maximum width B of the caterpillar-type vehicle.

In the illustration of FIG. 4 which essentially corresponds to that of FIG. 3, however, with the crawler tracks 13 being shown partially broken away, it is shown that pairs of arms 15 and 16 are hinged to the free ends of the support beams I 1. The arms 15 and 16 can be swung about vertical axes 17 by an angle of approximately 90°. The cross-sectional contours of the arms 15 and 16 are dimensioned in such a way that the circumferential contours, when the arms are swung towards each other and rest against each other, as shown in the lower half of FIG. 4, corresponds to that of the support beam 11, so that a plane support surface for the crawler track support 12 is provided over the entire length of the support beam 11 which is extended by the length of the arms.

FIGS. 5 and 6 show the arms 15 and 16 on a larger scale as compared to FIG. 4. Near the free ends of the arms 15 and 16, pairs of recesses are provided which define a bore duct 18 when the arms are swung towards each other and rest against each other, as shown in FIG. 5. In addition, pairs of passage bores 19 are provided on both sides of the bore duct 18, as shown in FIG. 5. As can be seen in FIGS. 5 and 6, when the arms 15 and 16 are swung against each other for extending the support beam I 1, a bolt is inserted in the duct 18, wherein the cross-sectional contour of the bolt corresponds with respect to shape and size to the cross section of the bore duct 18. Subsequently, threaded bolts are inserted in the passage bores 19 provided on both sides of the bore duct 18 and the two arms 15 and 16 are clamped against each other by means of the threaded bolts. The bolt in the bore duct 18 forms a stable triangle together with the two pivot axes 17. Additional rings 20 are welded to the free end faces of the arms 15 and 16.

As illustrated in the upper half of FIG. 4, in the position of transportation of the endless track-type vehicle, the arms 15 and 16 are swung toward the crawler track support 12. Hooks to be inserted in the rings 20 are hinged to the crawler track support 12. Accordingly, the arms 15 and 16 are fixed and secured in the described position for the transportation of the endless track-type vehicle.

When the width of the endless track-type vehicle is to be increased at the location of use, the above-mentioned hooks are removed and the arms 15 and 16 are swung toward each other, so that they assume the position illustrated in the lower portion of FIG. 4. The bolts are then inserted into the bore duct 18 formed between the arms and threaded bolts are inserted and tightened in the passage bores 19. Consequently, the arms 15 and 16 together with the support beam 11 form a stable structural element which has a uniform cross-section over the entire length thereof. The crawler track support 12 mounted on the support beam I 1 can now be pushed outwardly on this extension formed by the arms by the above-described means, so that the width of the endless track-type vehicle can be substantially increased. Once the desired width is reached, the track rods are mounted in the above-described manner. For clarity's sake, and since they are of conventional construction and arrangement, the hydraulic piston-cylinder unit used for displacement and the above-described tie rods are not illustrated.

In the illustrated embodiment, the extension for the support beam 11 is provided by a pair of swingable arms 15 and 16. Basically, it would also be possible to provide only a single swingable arm at the free end of the support beam 11, while meeting all other requirements described above.

FIG. 4 of the drawing shows in the upper half thereof the smallest possible width B of the chassis which also corresponds to the width of the superstructure of the caterpillar-type vehicle. This smallest possible width B' must be adjusted when the endless track-type vehicle is transported on public roadways by means of flat-bed trucks or trailers from one location to another without making special arrangements.

It should be understood that the preferred embodiments and examples described are for illustrative purposes only and are not to be construed as limiting the scope of the present invention which is properly delineated only in the appended claims.

What is claimed is:

1. A chassis for endless track-type vehicles comprising at least a pair of support beams extending parallel to each other and projecting essentially horizontally from two sides of the chassis, a crawler track supports being provided on each side of the chassis, the crawler track support being mounted on the support beams so as to be slidable relative to the support beams for adjusting the width of the vehicle, each support beam having free outer ends, at least one arm swingable about a vertical axis being attached to the free outer end, the at least one arm having a circumferential contour and width which corresponds at least in one of an upper portion and a lower portion thereof to the support beam, further comprising locking means for locking the arm when the arm is swung into a position in which it extends in the same direction as the support beam.

2. The chassis according to claim 1, wherein the arm is swingable by an angle of 90°.

3. The chassis according to claim 1, comprising additional locking means for locking the arm when the arm is swung into a position in which it extends in the same direction as the crawler track support.

4. The chassis according to claim 1, comprising a pair of swingable arms mounted at each free outer end of the support beams, and wherein the circumferential contours and widths of the two arms correspond at least in one of an upper and lower portion thereof to the support beam when the arms are swung together and rest against each other.

5. The chassis according to claim 4, wherein the arms have free ends, further comprising means for clamping the free ends of the two arms together.

6. The chassis according to claim 5, wherein the clamping means are threaded bolts inserted in the arms.

7. The chassis according to claim 4, wherein the arms have sides facing each other when the arms are swung against each other, the sides having near free outer ends thereof recesses located opposite each other and defining a vertical bore duct for receiving a bolt, wherein the bolt and the duct have the same cross-sectional shape and dimension.

8. The chassis according to claim 1, wherein the at least one swingable arm has a width, a crawler track mounted on each crawler track support, each crawler track projecting laterally from the crawler track support by a lateral distance, wherein the width of the at least one arm and the lateral distance are equal.

* * * * *